United States Patent [19]

Sameh et al.

[11] Patent Number: 4,460,547
[45] Date of Patent: Jul. 17, 1984

[54] SEPARATING ACTINIDE IONS FROM AQUEOUS, BASIC, CARBONATE CONTAINING SOLUTIONS USING MIXED TERTIARY AND QUATERNARY AMINO ANION EXCHANGE RESINS

[75] Inventors: Ali Sameh, Ettlingen; Jürgen Haag, Karlsruhe, both of Fed. Rep. of Germany

[73] Assignee: Kernforschungszentrum Karlsruhe GmbH, Karlsruhe, Fed. Rep. of Germany

[21] Appl. No.: 437,511

[22] Filed: Oct. 28, 1982

[30] Foreign Application Priority Data

Nov. 12, 1981 [DE] Fed. Rep. of Germany ....... 3144974

[51] Int. Cl.³ .............................................. C22B 60/02
[52] U.S. Cl. .......................................... 423/7; 423/17
[58] Field of Search ........................................ 423/7, 17

[56] References Cited

U.S. PATENT DOCUMENTS

| | | | |
|---|---|---|---|
| 2,864,667 | 12/1958 | Bailes et al. | 423/7 |
| 3,835,044 | 9/1974 | Schulz | 423/7 |
| 4,026,987 | 5/1977 | Yarnell | 423/7 |
| 4,118,457 | 10/1978 | Seko et al. | 423/7 |
| 4,199,470 | 4/1980 | Yasuda et al. | 423/7 X |
| 4,233,272 | 11/1980 | Eresen et al. | 423/7 |
| 4,312,838 | 1/1982 | Yan | 423/17 X |

FOREIGN PATENT DOCUMENTS 779995  7/1957  United Kingdom ................. 521/26

OTHER PUBLICATIONS

"An Ion Exchange Process for the Recovery of Uranium from Carbonate Leach Solutions", by Shankar et al., *Proceedings of the International Conference on the Peaceful Uses of Atomic Energy*, vol. 8, 1956, pp. 64–69.
"Extraction of Uranium from Solutions of Sodium Carbonate by Means of Anionic Exchange with Dowex 1 Resin", by M. Urgell et al., Proceedings of the Second United Nations International Conference on the Peaceful Uses of Atomic Energy, vol. 3, 1958, pp. 444–464.
Merritt, R. C., The Extractive Metallurgy of Uranium, Colorado School of Mines Research Institute, 1971, pp. 151–163.

*Primary Examiner*—Deborah L. Kyle
*Assistant Examiner*—Matthew A. Thexton
*Attorney, Agent, or Firm*—Sughrue, Mion, Zinn, Macpeak and Seas

[57] ABSTRACT

A process for the separation of actinide ions from aqueous, basic, carbonate containing solutions with the use of basic ion exchangers. The actinide ions are sorbed at a weakly basic anion exchanger comprised of a polyalkene matrix provided in the majority with tertiary and in the minority with quaternary amino groups. The charged ion exchanger is separated from the solution and then the actinide ions are eluted from the exchanger with nitric acid.

7 Claims, 6 Drawing Figures

SEPARATING ACTINIDE IONS FROM AQUEOUS, BASIC, CARBONATE CONTAINING SOLUTIONS USING MIXED TERTIARY AND QUATERNARY AMINO ANION EXCHANGE RESINS

BACKGROUND OF THE INVENTION

The present invention relates to a method for separating actinide ions from aqueous, basic, carbonate containing or carbonate and degradation product containing solutions with the aid of basic ion exchangers.

In wet chemical reprocessing of irradiated nuclear fuel and/or breeder materials from nuclear reactors, which is done almost exclusively according to the Purex process, the actinides uranium and plutonium which serve as fission materials, are recovered from the aqueous fuel solution and/or breeder material solution. The aqueous fuel solution and/or breeder material solution has a high concentration of nitric acid and also contains, inter alia, the highly radioactive fission products. This recovery is achieved by initially extracting or converting the actinides to an organic phase from the aqueous fuel and/or breeder material solution by use of an organic solution comprised of tributyl phosphate (TBP) extraction agent in kerosene. During this extraction process, small quantities of TBP are decomposed by radiolysis to mono and dibutyl phosphate (MBP and DBP). These decomposition products form stable complexes with actinides, specifically DBP with plutonium, and such complexes cannot be extracted from the organic phase with nitric acid.

In order to avoid the accumulation of decomposition products, and thus increased losses of actinides during recycling and reuse of the extraction agent solution which is necessary for economical reasons, the TBP solution is subjected to a carbonate wash after each extraction cycle. This carbonate wash removes from the TBP solution the decomposition products formed by radiolysis, but also unavoidable, small quantities of actinides, specifically the alpha radiators uranium, neptunium and plutonium. The isolation and recovery of these actinide quantities from the carbonate wash water, which must be considered a waste liquid, is gaining increasingly in significance. The most substantial separation possible of these elements present in the aqueous waste solution in the form of soluble carbonate compounds would lead to a decisive reduction in the problems of final storage for medium radioactive waste streams (MAW) which includes, inter alia, the contaminated carbonate water.

The prior art treatment and removal of aqueous, carbonate containing waste solutions involved the combination with other aqueous waste solutions which were subsequently concentrated whereupon the concentrates were solidified with cement and in bitumen.

More than 25 years ago, a process was disclosed for the exploitation of uranium-poor ores in which the finaly ground ore was boiled with a carbonate solution and the resulting diluted uranyl carbonate solution was conducted, for the purpose of concentration, over a highly basic anion exchanger. See. J. Shankar et al, "An Ion Exchange Process for the Recovery of Uranium from Carbonate Leach Solutions", *Proceedings of the International Conference on the Peaceful Use of Aromatic Energy,* 1955, Geneva, Volume 8, pages 64 to 69. The four-valent complex uranyl tricarbonate anion $[UO_2(CO_3)_3]^{-4}$ present in the alkali carbonate containing solution was adsorbed at a highly basic resin selected from phenyl ethylene divinyl benzene copolymers with active groups of $-CH_2N^+(CH_3)_3$, known under the tradename of Amberlite IRA-400. In order to desorb the uranium quantity accumulated in the anion exchanger column, Shankar et al employed only neutral and alkali elution agents because it was noted that an acid containing elution agent releases $CO_2$ from the complex anion, and the resulting excess pressure leads to a breaking open or destruction of the column. One to two molar NaCl or $NaNO_3$ solutions brought the best results for the elution of the uranium. Since, however, the presence of chlorine ions in the subsequent processing of chlorine ions in the subsequent processing of the uranium containing concentrated eluates is undesirable for reasons of corrosion, Shankar et al recommended only the use of $NaNO_3$ solutions. In the course of the adsorption tests, it was noted that the capacity of the anion exchanger decreased with increasing concentration of dissolved sodium carbonate.

Corresponding experiences were described by M. Urgell et al, in an article entitled "Extraction of Uranium from Solutions of Sodium Carbonate by Means of Anionic Exchange with Dowex 1 Resin", appearing in *Proceedings of the Second UN Conference on the Peaceful Uses of Atomic Energy,* Geneva, Volume 3, pages 444–464, 1958, who performed their tests regarding the adsorption of uranium at highly basic anion exchangers and subsequent desorption with an anion exchanger of the same type known under the commercial name of DOWEX 1.

When the known process for the accumulation and recovery of uranium from uranium-poor ores with the aid of ion exchangers was applied to the separation of actinides from aqueous, basic, carbonate containing or carbonate and degradation product containing solutions, for example to the wet chemical reprocessing of irradiated nuclear fuel and/or breeder elements, the drawbacks of the prior art process were transferred as well. Such drawbacks are, for example, the relatively low capacity of the ion exchangers, and a relatively poor elution characteristic. If the carbonate ion concentration in the aqueous solution is stoichiometric compared to the uranyl tricarbonate complex, or even less than stoichiometric, then the tricarbonate complex dissociates in a small portion into a dicarbonate complex having the anion $[UO_2(CO_3)_2(H_2O)_2]^{-2}$ and into $CO_3^{-2}$. If, however, the aqueous solution has an excess of carbonate, the $CO_3^{-2}$ ion competes with the tricarbonate ion during the adsorption at the highly basic anion exchanger. That means the capacity of the anion exchanger is reduced for the complex anion because of the excess of carbonate ions.

SUMMARY OF THE INVENTION

It is an object of the present invention to provide a method for the separation of actinide ions from aqueous solutions which contain carbonate ions.

A further object of the present invention is to provide such a process which surpasses the prior art processes with respect to efficiency during the adsorption of the uranyl carbonate complex as well as during the desorption, which is less sensitive to changes in the concentration of the $CO_3^{-2}$ ions, and which nevertheless is simple and easily implemented.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing obejcts and in accordance with its purpose, the present invention provides a process for separating actinide ions from an aqueous, basic carbonate containing solution with a basic ion exchanger, comprising: sorbing the actinide ions at a weakly basic anion exchanger made of a polyalkene matrix provided in the majority (more than 50% of the total number of amino groups) with tertiary and in the minority with quaternary amino groups, separating the charged ion exchanger from the solution, and then eluting the actinide ions from the ion exchanger with nitric acid.

From the large number of basic anion exchangers, the above-mentioned type has been found to be suitable for the adsorption of actinide ions, as well as for their elution from the exchanger.

The nitric acid suitable for elution of the actinide ions preferably has a molarity in the range of 0.2M to 8.0M, and most preferably, a molarity of 2M to 4M. Advantageously, the actinide ions are eluted by supplying $HNO_3$, which generates $CO_2$ gas which escapes, to the ion exchanger in a direction which is substantially the same as the direction of the escaping $CO_2$ gas. In this way, the dreaded bursting of the ion exchanger column during elution with an acid is avoided.*

*The ratio of tertiary to quaternary amino groups on the polyalkene matrix of the basic anion exchanger preferably is ten to one respectively.

It is to be understood that both the foregoing general description and the following detailed description are exemplary, but are not restrictive of the invention.

DETAILED DESCRIPTION OF THE INVENTION

Figure 1:
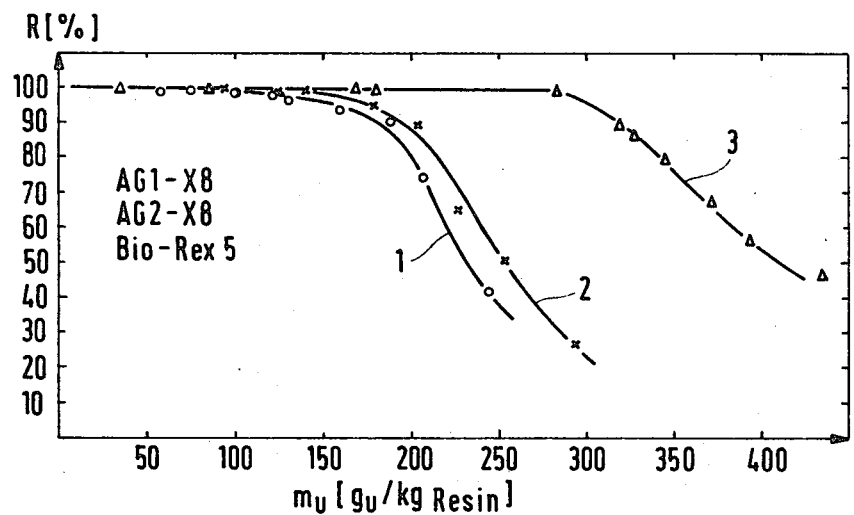
FIGS. 1 to 6 are graphic illustrations showing comparative results for tests performed with an exchanger in accordance with the present invention and tests performed with two highly basic exchangers similar to those employed in the prior art processes.

In the practice of the present invention, aqueous, basic carbonate containing solutions which contain actinide ions are treated with a basic ion exchanger. The aqueous basic carbonate containing solutions can contain degradation products.

The present invention and the efficiency of the process according to the present invention, respectively, will now be explained in greater detail with the aid of exemplary examples for the sorption and desorption of various actinide ions at anion exchangers and with the aid of several graphic illustrations. These examples disclose the utility of a weakly basic anion exchanger according to the present invention compared to two different, highly basic anion exchangers which are similar in their chemical composition to those of the prior art processes.

All of the examples were conducted with the following ion exchangers:

(a) a weakly basic exchanger in accordance with the present invention comprised of a polyalkene epoxy polyamine with tertiary and quaternary amino groups having the chemical composition:

$$R-N^+(CH_3)_2Cl^- \text{ and}$$

$$R-N^+(CH_3)_2(C_2H_4OH)Cl^-$$

where R represents the polyalkene epoxy portion, and known under the trade name Bio-Rex 5, made by Bio-Rad Laboratories, Richmond, Calif., U.S.A. For all practical purposes there are no other functional groups. The matrix is all one epoxy polymer.

(b) a highly basic exchanger comprised of polystyrene divinyl benzene with quaternary amino groups having the chemical composition:

$$\phi-CH_2N^+(CH_3)_3Cl^-$$

where $\phi$ represents the polystyrene divinyl benzene portion, and known under the trade name AG 1 X-8, made by Bio-Rad Laboratories, U.S.A. This exchanger corresponds to the exchangers Dowex 1 X-8 made by Dow Chemical Company, and Amberlite IRA 400 made by Rohm and Haas Co.

(c) a highly basic exchanger comprised of polystyrene divinyl benzene with quaternary amino groups having the chemical composition $$\phi-CH_2N^+(CH_3)_2(C_2H_4OH)Cl^-$$

where $\phi$ represent the polystyrene devinyl benzene portion, and known under the trade name AG 2-X8 made by Bio-Rad Laboratories, U.S.A. This exchanger corresponds to the exchangers Dowex 2-X8 made by Dow Chemical Company, and Amerlite IRA 410 made by Rohm and Haas Co.

EXAMPLE 1

This example illustrates the sorption of uranyl tricarbonate anions on the above-mentioned anion exchangers and desorption of uranium with nitric acid.

For the sorption of the uranium carbonate complex anion, the same quantities of the various exchangers were brought into contact with different volumes of a $2 \times 10^{-2} M \ Na_4[UO_2(CO_3)_3]$ solution and left to stand. The equilibrium setting took place very slowly. In order to obtain reproduceable results, it was necessary to stir for 24 hours at room temperature. Thereafter, the adsorption of the uranium complex at the ion exchangers was examined.

The grain size of the exchanger resins AG 1 X-8, Ag 2 X-8 and Bio-Rex 5 was 50 to 100 mesh each time (U.S. standard), which corresponds to a grain diameter of 0.149 to 0.297 mm. The resins were obtained in the chloride form, and all statements herein relate to this form.

In order to be able to compare the various exchangers with one another, the measured values were either related to the volume unit of expanded resin, or to the weight unit of dried resin. The data determined in this connection are compiled in Table 1.

TABLE 1

| | Exchanger Data | | |
|---|---|---|---|
| | AG 1-X8 | AG 2-X8 | Bio-Rex 5 |
| 1 ml expanded resin corresponds to: | | | |
| ml dry resin | 0.60 | 0.71 | 0.40 |
| g dry resin | 0.44 | 0.44 | 0.32 |

To obtain the values of Table 1, a previously determined volume of expanded exchanger was dried at 60°

C. until it attained a constant weight, the volume was then determined, and the exchanger was weighed.

FIG. 1 shows the dependence of the fixed uranium component R, in [%], on the charged uranium quantity $m_U$, in gram uranium per kg resin, for systems employing the anion exchangers AG 1 X-8 (curve 1), AG 2 X-8 (curve 2) and Bio-Rex 5 (curve 3) in the solid phase and a $2 \times 10^{-2}$M $Na_4[UO_2(CO_3)_3]$ solution in the liquid phase. It can be seen very clearly from FIG. 1 that the ion exchanger according to the present invention (curve 3) permits almost double the charge compared to the ion exchangers which are not part of the present invention (curves 1 and 2).

After one washing of the uranium charged exchanger Bio-Rex 5 in the column with diluted carbonate solution ($10^{-3}$ to $10^{-4}$M), the uranium was eluted with $HNO_3$ of a different molarity. In order to prevent bursting of the column due to the build-up of $CO_2$ pressure generated by the influx of nitric acid, the $HNO_3$ was added to the column from the bottom of the top.

Figure 2:
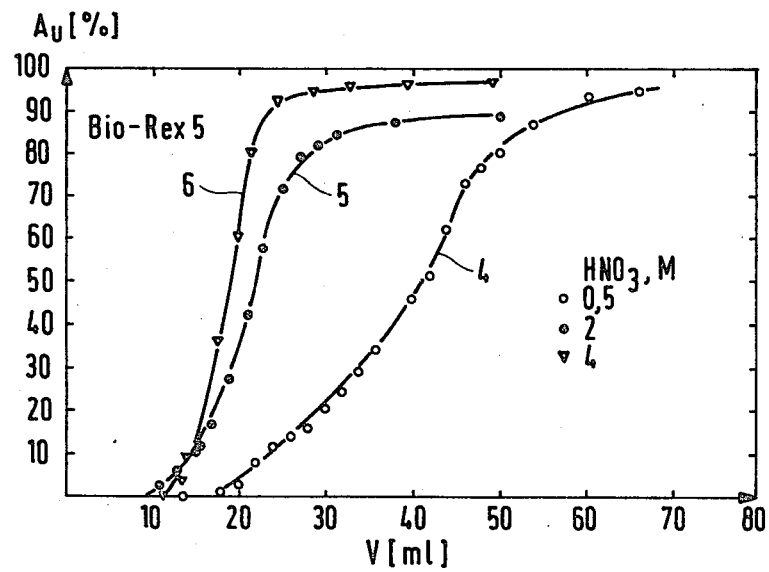

FIG. 2 shows the dependence of the eluted uranium component A, in [%] of the sorbed uranium, on the eluate volume V, in [ml] in the system containing Bio-Rex 5 for 0.5 (curve 4), 2 (curve 5) and 4 (curve 6) molar $HNO_3$ as the elution agent. The column volume was 8 ml and the charge was 200 g U/kg resin. The optimum elution conditions thus are between 2 and 4 molar $HNO_3$. Therefore, 4 molar nitric acid was used for a comparison of the elubility of the various uranium charged ion exchangers.

Figure 3:
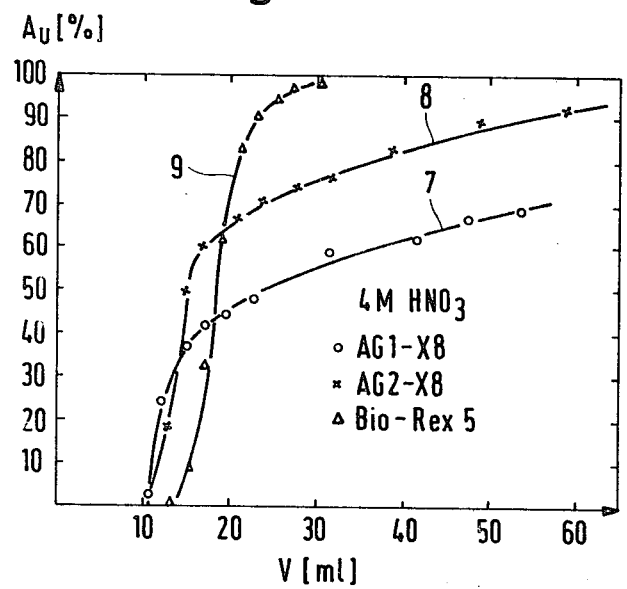

FIG. 3 shows the dependence of the eluted uranium component $A_u$, in [%] of the respectively sorbed uranium, on the elute volume V, in [ml], for the elution with 4 molar $HNO_3$ as the elution agent, respectively, in AG 1 X-8 (curve 7), AG 2 X-8 (curve 8) and Bio-Rex 5 (curve 9) containing systems. The column volume was 8 ml and the charge was 200 g U/kg resin. Here again, the anion exchanger according to the present invention (curve 9) is clearly far superior to the other two ion exchangers being examined.

The substantially lesser charge of the highly basic ion exchanger can be explained with the competition for the carbonate ions occurring there between the actinide dicarbonate ions and the quaternary ammonium groups of the exchangers. The inadvertent charge of the exchanger with $CO_3^{-2}$ ions leads to a significant reduction in exchanger capacity for the actinide complexes. These competitive reactions are substantially suppressed or even completely avoided when an anion exchanger according to the present invention is used.

EXAMPLE 2

This example illustrates the charging of the three above-mentioned types of exchangers with $[NpO_2(CO_3)_3]^{-4}$ complex anions.

The procedure was the same as described in Example 1, except that an $8 \times 10^{-3}$M $Na_4[NpO_2(CO_3)_3]$ solution was used.

Figure 4:
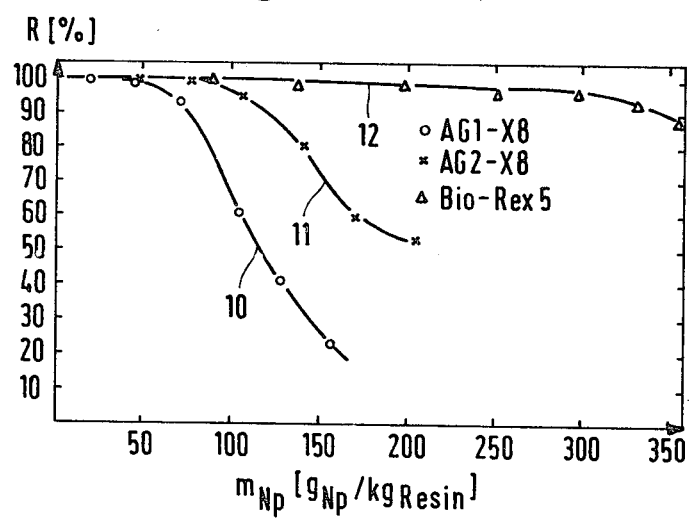

FIG. 4 shows the dependence of the fixed neptunium component R, in [%], on the charged quantity of neptunium $m_{Np}$, in gram neptunium per kg resin, for systems employing the exchangers AG 1 X-8 (curve 10), AG 2 X-8 (curve 11) and Bio-Rex 5 (curve 12) in the solid phase and an $8 \times 10^{-3}$M $Na_4[NpO_2(CO_3)_3]$ solution in the liquid phase. In the illustration of the neptunium retention capability of the three above-mentioned ion exchangers, the superiority of the weakly basic anion exchanger of the present invention (curve 12) over the highly basic anion exchangers was particularly clearly evident. A comparison of the elubility of neptunium from these exchangers corresponded to the elubility of uranium in Example 1.

EXAMPLE 3

This example illustrates the absorption of plutonyl tricarbonate complex anions at the above-mentioned exchangers.

Under the same conditions as in Example 1, but with an $8 \times 10^{-3}$M $Na_4[PuO_2(CO_3)_3]$ solution, the efficiency of the plutonium carbonate removal from the solution of the ion exchangers employed in Example 1 was examined.

Figure 5:
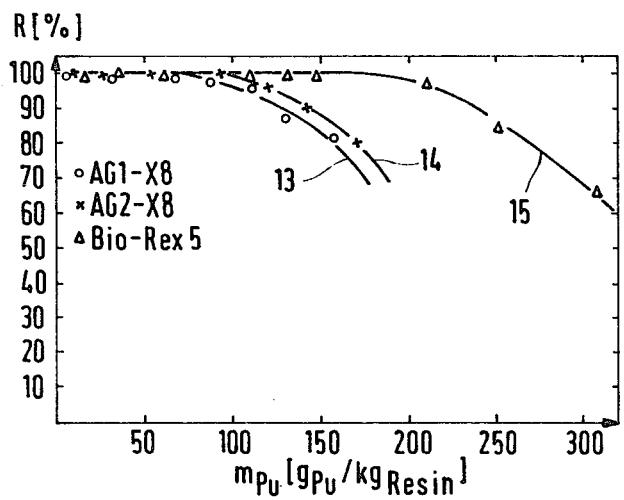

FIG. 5 shows the dependence of the fixed plutonium component R, in [%], on the charged quantity of plutonium $m_{Pu}$, in gram plutonium per kg resin, for systems employing the anion exchangers AG 1 X-8 (curve 13), AG 2 X-8 (curve 14) and Bio-Rex 5 (curve 15) in the solid phase and an $8 \times 10^{-3}$M $Na_4[PuO_2(CO_3)_3]$ solution in the liquid phase.

For the plutonyl tricarbonate anion as well, it is evident that the exchanger according to the present invention is superior to the highly basic exchangers. A comparison of the elubility of the plutonium fixed on the exchanger materials corresponds in its results to the elubility of uranium in Example 1.

EXAMPLE 4

This example illustrates a dynamic experiment in which comparable quantities of the three above-mentioned ion exchangers were introduced into columns having identical dimensions and an 0.01M $Na_4[UO_2(CO_3)_3]$ solution was introduced into each column at the same constant flow rate.

Figure 6:
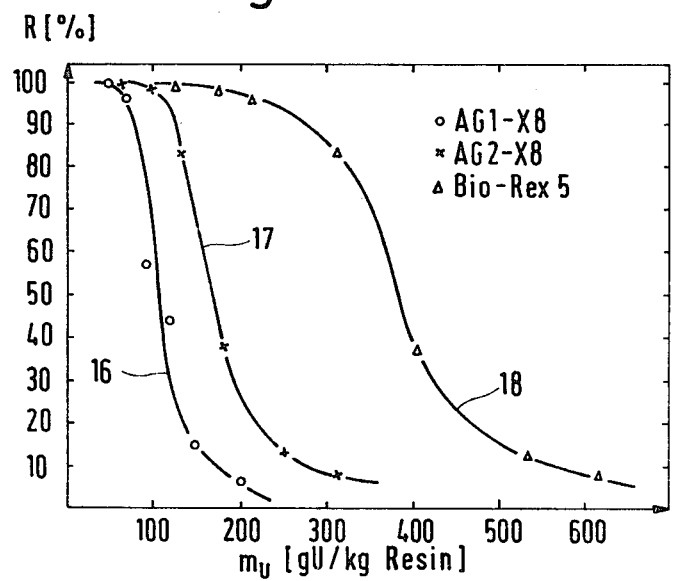

FIG. 6 shows the dependence of the fixed uranium component R, in [%], on the charged uranium quantity $m_U$, in gram kg resin, in a dynamic test for systems employing the anion exchangers AG 1 X-8 (curve 16), AG 2 X-8 (curve 17) and Bio-Rex 5 (curve 18) in the solid phase and an 0.01M $Na[UO_2(CO_3)_3]$ solution in the liquid phase, at a flow rate of 0.75 ml/min cm².

In the dynamic test as well, the great advantages of the weakly basic ion exchangers of the present invention over the highly basic exchangers became clearly evident.

Finally, it can be stated that the ion exchanger Bio-Rex 5 produces an approximately twice as high retention of the actinide ions compared to the highly basic exchangers, and that thereafter the actinide ions can be quantitatively eluted from it again with only few column volumes of $HNO_3$. With highly basic exchangers, however, quantitative elution with $HNO_3$ is not successful under practical conditions. Due to the sorption of actinide nitrate complexes, quantitative elution of highly basic exchangers with $HNO_3$ is hardly possible or incomplete, respectively.

It will be understood that the above description of the present invention is susceptible to various modifications, changes and adaptations, and the same are intended to be comprehended within the meaning and range of equivalents of the appended claims.

What is claimed is:

1. Process for separating actinide ions from an aqueous basic, carbonate containing solution with a basic ion exchanger comprising: sorbing the actinide ions at a weakly basic anion exchanger comprising a polyalkene matrix provided in the majority (more than 50% of the total number of amino groups) with tertiary and in the minority with quaternary amino groups, separating the charged ion exchanger from the solution, and then eluting the actinide ions from the ion exchanger with nitric acid.

2. Process as defined in claim 1, wherein the nitric acid from the elution of the actinide ions has a molarity in the range from 0.2M to 8.0M.

3. Process as defined in claim 1, wherein the nitric acid has a molarity of 2M to 4M.

4. Process as defined in claim 1, wherein the $HNO_3$ for elution of the actinide ions generates $CO_2$ gas which escapes, and the $HNO_3$ is supplied into the charged ion exchanger in the direction of the escaping $CO_2$ gas.

5. Process as defined in claim 1, wherein the ratio of tertiary to quaternary amino groups on the polyalkene matrix of the basic anion exchanger is 10 to 1 respectively.

6. Process as defined in claim 5, wherein the nitric acid has a molarity of 2M to 4M.

7. Process as defined in claim 1, wherein the actinide ions comprise uranium and plutonium ions.

* * * * *